INVENTORS
HERBERT H. THOMPSON
ARTHUR L. RAWLINGS

INVENTORS
HERBERT H. THOMPSON
ARTHUR L. RAWLINGS
BY
Herbert H. Thompson
ATTORNEY.

Patented Sept. 9, 1952

2,609,683

UNITED STATES PATENT OFFICE 2,609,683

AIR NAVIGATION SYSTEM

Arthur L. Rawlings, Little Neck, and Herbert H. Thompson, Manhasset, N. Y., assignors to The Sperry Corporation, a corporation of Delaware Application November 15, 1946, Serial No. 709,898

8 Claims. (Cl. 73—178)

This invention relates to gyroscopic navigational apparatus for use in ships or aircraft and has for its primary object the provision of means for determining the true speed of the craft over the ground and the true direction of travel, without the necessity for external observations and irrespective of currents in the medium through which the craft is moving.

To accomplish this purpose, we make use of two direction indicating instruments, one of which is subject to predetermined errors variable with known functions of the speed and course of the vehicle on which the device is mounted, and the other which is not affected thereby. By comparing the readings of these instruments, the error of the first instrument is determined from which the speed and course of the vehicle may be readily approximated and accurately obtained if the approximate speed and/or course, as determined by a speedometer and shown from the heading of the craft, respectively, are utilized. Our preferred instruments for this purpose are the well known gyroscopic compasses, the indications of which are subject to a systematic error which may be expressed by the following equation:

$$\tan D = \frac{K \cos H}{E \cos L}$$

where

D is the deviation,
K the ground speed of the craft in knots,
H the angle of the course of the craft measured from north,
E the surface speed of the earth at the equator, namely, 900 knots,
L the latitude of the craft.

As the other direction indicating instrument, we prefer to employ a magnetic compass. While the magnetic compass is subject to errors due to variations in the earth's magnetic field, etc. such may be compensated for by means not forming a part of this invention and which are not affected substantially by speed or course of the vehicle.

A feature of the present invention is the provision of automatic computing means for interpreting the indications of the gyro-compass, so that true ground speed and course may be read directly on calibrated dials.

Other features and objects as well as structural details of the invention will be apparent from the following description when read in relation to the accompanying drawings wherein.

Figure 1:
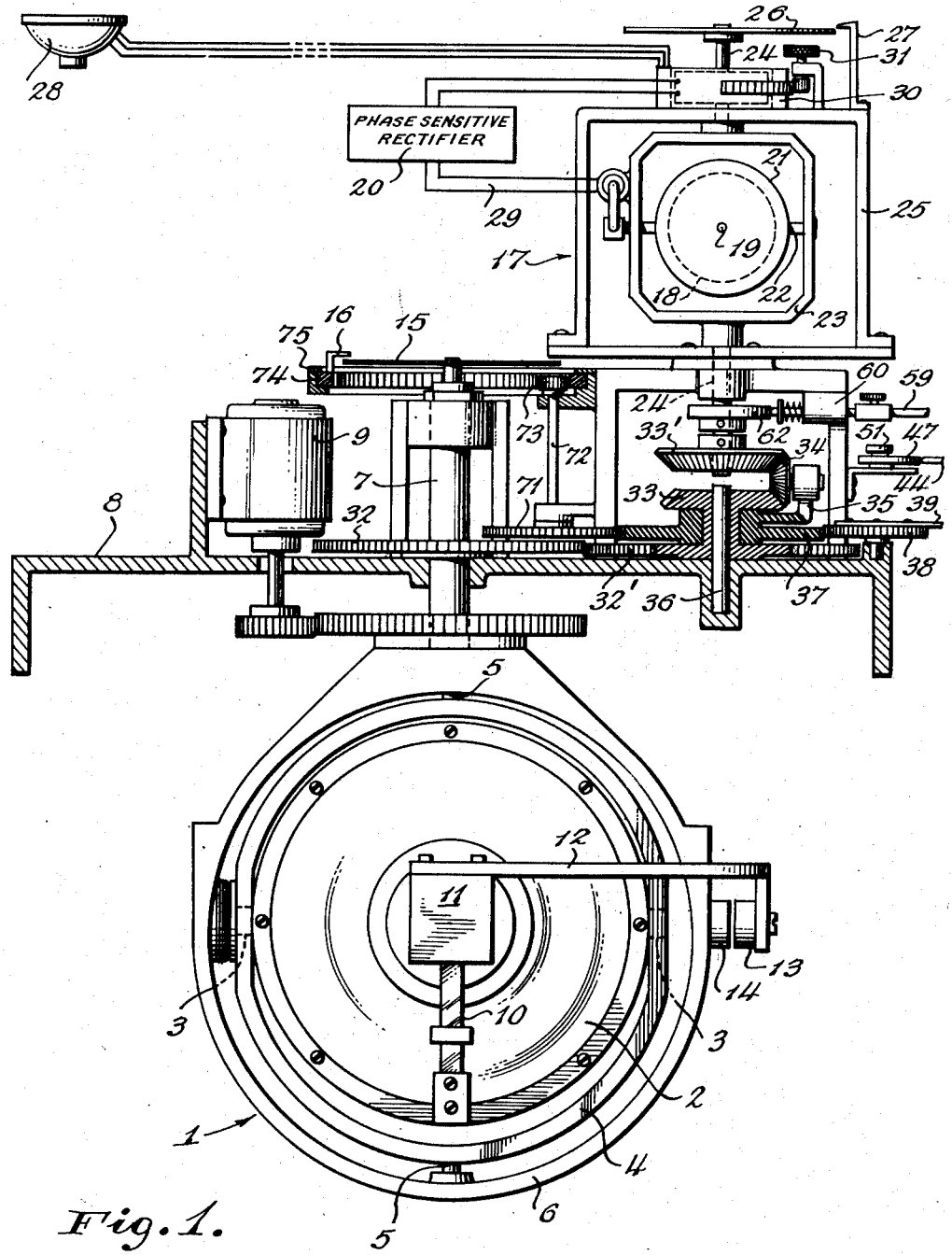
Fig. 1 is a diagrammatic view of part of one form of the invention.

Referring to Fig. 1, I is a gyro-compass which may be of any type. The compass shown by way of example is of the kind disclosed in the copending application of L. F. Carter, Serial No. 575,450, filed January 31, 1945, now Patent Number 2,510,068 issued June 6, 1950, and consists of a rotor, not shown, spinning about a substantially horizontal axle in a casing 2 supported on a pair of horizontal trunnion bearings 3, 3, in a vertical ring 4. The vertical ring is carried in bearings 5, 5, with freedom to rotate about a vertical axis inside the phantom ring 6, which itself can rotate about a vertical axis by journal bearing 7 in the gimballed spider 8 when driven by azimuth motor 9 so as to follow the motions of the vertical ring 4. The means used to eliminate friction at the vertical axis of the vertical ring, and the means of controlling the azimuth motor are well known to those versed in the gyro-compass art, and as such means form no part of the present invention, they are not herein further particularized.

Likewise, the manner of controlling the gyro to make it north-seeking and therefore able to function as a compass is not a part of the present invention. In the compass herein referred to for illustrative purpose, the north-seeking property and damping characteristics are conferred by attaching to the gyro casing an inverted pendulum consisting of a vertical flat ribbon or leaf spring 10 of steel or other elastic material carrying a mass 11. The stiffness of the spring is such that when the gyro axle is horizontal and the casing upright, the spring stands vertical and supports the mass 11 at its highest point. When the gyro tilts, the spring bends and allows the mass to move towards the north or south end of the gyro axle by an amount proportional to the angle of tilt.

The mass 11 carries an arm 12, at the other extremity of which is a small permanent magnet 13 so arranged that when the gyro axle is level, the axis of magnet 13 is in line with the trunnion axis 3, 3, of the gyro casing where it faces, without touching, a second permanent magnet 14 carried by the phantom ring 6. When the casing 2 of the gyro is tilted and the mass 11 consequently displaced to north or south, the magnets 13, 14 are no longer in line and the magnetic attraction or repulsion between them has a tangential component which exercises a turning moment about the vertical axis of the gyroscope and causes damping of its azimuthal oscillations in the well known manner. The phantom ring 6 carries by journal 7 a compass card or dial 15 which shows the ship's course against a lubber's mark 16 carried in a manner described hereinafter.

As in all gyro-compasses which depend on the earth's rotation for their operation, the orientation of the gyro axle is also affected by the movement of the ship over the earth's curved surface which constitutes a further rotation about the earth's center, and in the absence of special correcting means, the indications of the course are affected by a speed error as will be more fully described hereinafter.

The present invention further comprises a second compass or azimuth-indicating device 17, which may be some form of magnetic compass, or any other type which is not affected by the steady speed of the craft which carries it. In order to explain the present invention, this second compass is shown as of the "Gyrosyn" type disclosed in Patent No. 2,357,319 to Esval et al. As shown in Fig. 1 this consists of a slave directional gyro comprising a gyro rotor 18 maintained in continuous rotation, by means not shown, at a high speed around its normally horizontal axle 19 which is pivoted by bearings for rotation in a casing 21. Said casing is mounted on horizontal trunnion bearings 22, 22 in a vertical ring 23 which is carried by vertical axis bearings 24, 24, in frame 25 supported on the spider 8. The vertical ring 23 carries a card 26 which cooperates with a lubber's mark 27 on frame 25, and a cam 62, the purpose of which will appear hereinafter.

The directional gyro is monitored as set forth in the aforesaid patent by a flux valve 28, or similar device sensitive to the earth's magnetic field. The monitoring means consists of a remote control device, which may be electrical, mechanical, pneumatic or hydraulic. Aforesaid Patent No. 2,357,319 discloses the details of an electric control which, through a phase sensitive rectifier 20 and an electric cable 29 applies control couples to the directional gyro causing it to precess so as to follow the direction responsive output of the flux valve 28. The flux valve may be located in a part of the craft remote from the disturbing effects of magnetic material in the craft. The deviations caused by such disturbing effects are then, at the worst, very small, and can therefore be very accurately compensated for by local magnets (not shown) in accordance with the well-known procedures of magnetic compass adjusting.

Variation, or the error of the magnetic compass due to the skewness of the earth's magnetic field, is corrected by rotating the field of the signal transformer 30 by means of the manual correcting knob 31. The manner of constructing such correcting mechanisms is fully described in the aforesaid Patent 2,357,319. When the said corrections are properly made, the card 26 of the directional gyro indicates true north by means which are independent of the earth's rotation or the speed of the craft, while the card 15 of the gyro-compass indicates the north with an error depending on the speed and course of the craft and its latitude at the time.

As is well known, and explained, for instance in Patent No. 1,403,062 of 1922 to E. A. Sperry, the value of said error or deviation of the gyro-compass is given by the formula set forth above, i. e.:

$$\tan D = \frac{K \cos H}{E \cos L}$$

The above formula after suitable transposition can be written:

(1) $$K = \frac{E \cos L \times \tan D}{\cos H}$$

or (2) $$\cos H = \frac{E \cos L \times \tan D}{K}$$

It is assumed that in a craft where the instrument of this invention is to be used the navigator will know his latitude L within a close approximation. E is known and H is given approximately by the instrument in that it gives the heading. The value of D is the difference between the uncorrected gyro direction as given by compass card 15 and the corrected magnetic compass direction as given by card 26. Hence sufficient data are available for solving the formula and finding true ground speed K and true course H as distinguished from indicated heading and indicated airspeed. K is also known approximately from the air speed meter.

Although this may be done by calculation we prefer to introduce an automatic computing mechanism for the purpose and the manner of constructing such a mechanism will now be explained.

The phantom element 6 of the gyro-compass carries above it a toothed wheel 32, which drives at the same speed but in the reverse direction an equal wheel 32' and a bevel wheel 33. Vertical ring 23 carries an equal bevel wheel 33'. A bevel pinion 34 gears with both these wheels, 33 and 33'. Pinion 34 is rotatably mounted on arm 35 which in its turn is mounted for rotation round axle 36. This arrangement constitutes a differential gearing and it will be evident that the angle turned through by arm 35 will be half the difference of the angles of rotation of gears 33 and 33' respectively, that is to say, it will be half the difference of the indications of the compass cards 15 and 26, or D/2. The arm 35 carries a gear wheel 37 which meshes with gear wheels 71 and 38. Gear wheel 71, through shaft 72 and pinion 73, drives internally toothed wheel 74 rotatably mounted in a grooved housing 75. The lubber's mark 16, carried on internal wheel 74 then moves through twice the angle moved through by arm 35 so that indications of the card 15 when read against the lubber's mark 16 will be the same as those shown by card 26 against lubber's mark 27. The error of the gyro-compass is thereby corrected. Wheel 37 has twice as many teeth as wheel 38 and, therefore, wheel 38 turns through the angle D. The further details will be better understood from Fig. 2, where it will be seen that wheel 38 carries a radius fork 39. A pin 40 slidable freely but without shake in slot 41 in the frame is also embraced without shake by fork 39 so that when wheel 38 and fork 39 are rotated through the angle D the pin 40 is caused to travel a distance $C \tan D$ along slot 41, C being the distance between the center of wheel 38 and the nearest point in slot 41.

Pin 40 also slides freely but without shake in a slotted bar 42 hinged at 43 to one end of a plunger 44 which slides in a tubular guide 45. The other end of plunger 44 is pressed by spring 46 against the periphery of cam 47 rotatable about an axle at 48. Cam 47 carries a pointer 49 which moves over a scale 50 calibrated in degrees of latitude and a knob 51 by which it may be set by hand as required.

The slotted bar 42 also engages an upstanding pin 54 in one end of a bar 52 sliding in a guide 53. Now it will appear that if pin 43 is a fixed fulcrum for the bar 42 and pin 40 is moved a given distance along slot 41, then pin 54 and rod 52 will move by a lesser distance in the ratio of the lengths 43—54 and 43—40. This ratio can be varied by turning cam 47 which causes the plunger carrying hinge 43 to move up or down. By making the cam 47 of appropriate shape, the ratio can be made equal to the cosine of the latitude shown by pointer 49 against scale 50. Since, as already shown, the displacement of pin 40 in slot 41 is proportional to tan D it follows that the displacement of rod 52 through its guide 53 will be proportional to tan $D \times \cos L$.

It now remains to multiply this displacement by $$\frac{1}{\cos H}$$

to obtain a displacement proportional to the ground speed according to the formula previously developed, and this is contrived as follows:

Rod 52 carries a pin 56 at the end remote from pin 54. Said pin 56 slides in a slotted bar 57 hinged at 58 to a plunger 59 sliding in fixed guides 60 and pressed by spring 61 against the periphery of a cam 62. Said cam 62 is carried by the vertical ring 23 of the directional gyro (Fig. 1) and turns according to the course or heading H of the craft.

A rod 63 slides in a fixed guide 64 and carries at one end a pin 65 which engages the slot of bar 57, and at the other end a pointer 66 which indicates the speed K on a scale 67. Under the action of cam 62 the fulcrum 58 is raised or lowered. The cam 62 is so shaped that as it turns according to the heading H of the craft the ratio of the distance between pins 58 and 56 to the distance between pins 58 and 65 is proportional to the cosine of the course. It follows that the travel of pin 56 with rod 52 is reproduced by pin 65 and pointer 66, but increased in the ratio $$\frac{1}{\cos H}$$

The pointer therefore indicates the speed K on scale 67 according to the formula hereinbefore established.

It will be observed that when the craft is headed due east or west and cos H is zero the hinge pin 58 will be contiguous to the pin 56, and pin 56 will have no control over the position of slotted bar 57. For this reason a plunger 69 is provided which passes through a hole in the guide 64 and presses lightly on rod 63 under the action of spring 70. This friction hold is sufficient to hold rod 63 in place at moments when the craft is exactly on an east or west heading, but not enough to interfere with its normal working on other courses. On courses near east or west when pin 58 is brought very close to pin 56 the movement of rod 63 will be many times greater than that of rod 52 and it might be thought that provision would therefore have to be made for very long travel of rod 63. This is not the case for it will be evident from inspection of the formula $$\tan D = \frac{K \cos H}{E \cos L}$$

that as H approaches 90° cos H tends to zero, and therefore tan D tends to zero also. In other words the displacement of rod 52 becomes very small near east or west courses and so compensates for the magnification of the motion of rod 63. For example, if the craft turns from northeast to southeast through east, speed will be correctly shown continuously by the index 66 and although momentarily, while the course is due east, the position of rod 63 will be indeterminate, the rod will be held at the last effective value by the friction of plunger 69.

In the foregoing it has been assumed that the heading H as given by the corrected magnetic compass would be the same as the actual course of the craft over the ground. This will not be strictly true when there is a strong cross wind or sea but in general the difference between true and apparent course will not introduce a serious error into the speed indication. If the cross current or wind is of known value, a suitable allowance can be made by the navigator by the usual methods. If the amount of the cross-current or wind is unknown, the apparatus hereinbefore described may be used to ascertain it as follows.

The craft is temporarily turned to travel in a direction at right angles to the desired course, and the ground speed read off. The craft is then turned 180° so as to travel in the reverse direction, still at 90° to the desired course, and the ground speed is again measured. Provided that the engine throttle setting or propeller speeds have been kept constant while the detour was being made, then half the difference of the two ground speeds will be the drift speed.

The apparatus of the present invention may also be used when the forward speed of the craft is known to read true course over the ground which, in the presence of a strong cross current or wind, may be very different from the compass heading of the craft.

Figure 2:
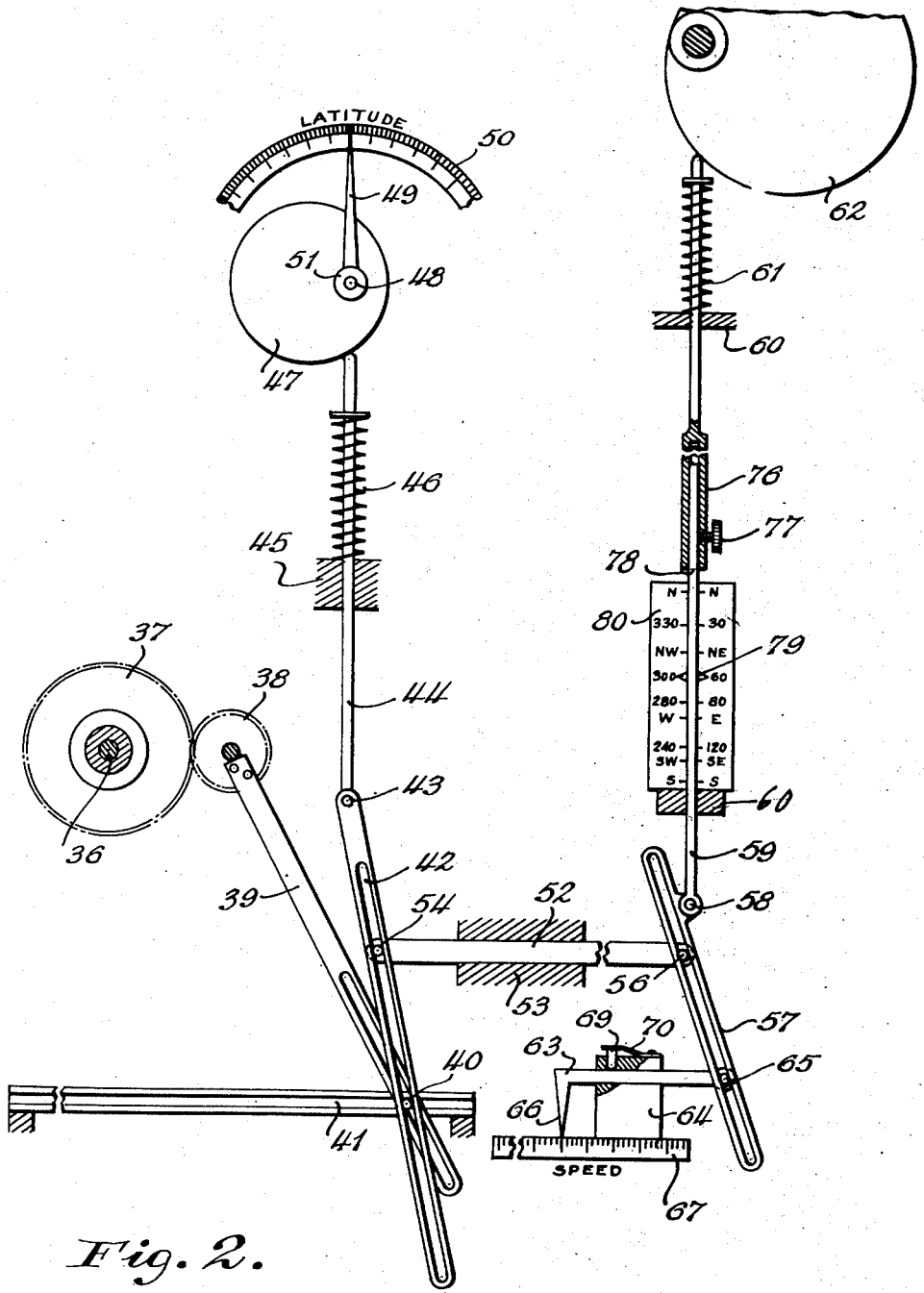
Fig. 2 is a diagrammatic view of parts not shown in Fig. 1.

One means of reading true course may be seen from Fig. 2 where a telescopic coupling 76 is shown in plunger 59 and a clamp screw 77 is provided for securing or releasing said coupling. When the apparatus is to be used for indicating ground speed as hereinbefore described, the screw 77 is tightened, the proper length of the plunger being assured by first bringing reference mark 78 which is engraved on rod 59 to coincide with the extremity of the tube 76.

When true course is to be determined, corresponding to a given speed, screw 77 is released so that cam 62 no longer controls the position of hinge 58. The rod 59 is then slid by hand in its guide 60 until pointer 66 indicates the known speed on scale 67. The rod 59 is then in the position it would have occupied if cam 62 had been turned to the true course corresponding to that speed. A pointer 79 carried on rod 59 will then indicate the true course on a suitably calibrated scale 80. It will be observed that the scale is double since there are in general two courses corresponding to a given speed error. For example, the same speed error arises, and therefore the same displacement is given to bar 52 when the course is northeast as when it is northwest. In practice no inconvenience can result from this ambiguity since the course is already approximately given by the compass cards 15 and 26. It will, of course, be understood that both methods of using the instrument may be employed together where an accurate knowledge of both ground speed and course are desired.

Thus, if it is first assumed that the course over the ground is the same as the compass heading, and the instrument is used to solve Equation 1 then it may happen that the ground speed so found will differ substantially from the pilot's estimate because of error in the assumed course. In such a case, after releasing coupling screw 77, the pointer 79 may be adjusted to split the difference between course as read on scale 80 and speed as read on scale 67 so as to get the closest possible approximation of both course and speed simultaneously. As the two values so found will both be consistent with the gyro-compass error D given automatically by the lever arm 39 the approximations to both true course and ground speed will be very close. Hence our improved instrument furnishes means whereby an airplane may fly to a given destination by dead reckoning through heavy fog without dependence upon radio aids which, at present at least, are not always reliable.

As many changes could be made in the above described construction, and many embodiments of this invention could be made having apparently wide differences without departing from the scope thereof, it is intended that all matter contained in the accompanying drawings shall be interpreted as illustrative and not in a limiting sense. In particular, although a particular form of gyro-compass and of magnetic compass have been shown herein, it is to be understood that this invention applies to any pair of instruments adapted to give indications of one phenomenon (in the present case, ships heading or azimuth) provided that the indications of one instrument of the pair are unaffected by ship's speed, while the indications of the other instrument are systematically affected by speed error according to some known law.

What is claimed is:

1. In a navigational instrument for use in mobile craft, the combination of a self-orienting north-seeking gyro-compass the azimuth indications of which are affected by a systematic error depending on the speed, latitude and course of the craft and a directional gyro monitored by an instrument for indicating the direction of the horizontal component of the earth's magnetic field, a movable element, a differential device actuated by the azimuth indicating members of the gyro-compass and the directional gyro respectively so as to displace said movable element by an amount proportional to the speed and course error of the gyro-compass, a second movable element capable of being manually set according to a function of the latitude of the craft, a third movable element displaceable by the directional gyro according to a function of the course of the craft, and means for combining the displacements of said three elements so as to displace a fourth element by an amount proportional to the speed of the craft over the ground.

2. In a navigational instrument for use in mobile craft to show the course and speed of the craft over the ground, the combination of a gyro-compass having a rotor with a substantially horizontal axle, a gravity device for making the axle seek the north but with an error depending on the speed and course of the craft and a power-driven following element reproducing the azimuth of the rotor axle; a directional gyro mounted for free movement universally in gimbals, having torque producing means for causing the gyro to precess in azimuth so as to follow the indications of a magnetic device sensitive to the direction of the earth's field; a pendulously mounted fluxgate giving a signal according to its orientation with respect to the horizontal component of the earth's magnetic field; a comparison device for comparing said signal with the orientation of the directional gyro and giving a second signal according to the difference indicated by said comparison; a rectifier for rectifying said second signal to energize said torque producing means causing the directional gyro to precess and line up with the horizontal component of the earth's field; a differential gear of which the outer members are driven by the follower element of the gyro-compass and the vertical ring of the directional gyro respectively while the middle member moves proportionately to the difference of movement of the outer members; multiplying means for introducing a factor proportional to a function of the latitude; dividing means for dividing the last-named product by a function of the course of the craft as indicated by the directional gyro; and indicating means for showing on a scale the ground speed of the craft as the result of said mechanical computing operations.

3. In a navigational instrument for finding the ground speed of the craft in which it is carried, a gyro compass, a magnetic compass, computing means for computing the ground speed from the latitude, the course of the craft and the difference between the azimuth directions of said gyro compass and said magnetic compass, said computing means having a latitude element adapted to be set by hand, a course element, means for automatically setting said course element from the heading of the ship as indicated by one of said compasses, a difference element automatically set by said gyro-compass and said magnetic compass, an indicating element for showing the ground speed, a computing device actuating said indicating element and controlled from said other elements, and means for holding said indicating element at the last computed position when the course of the craft is such that the ground speed is temporarily indeterminate.

4. In a navigational instrument for finding the ground course of the craft in which it is carried, a gyro compass, a magnetic compass, computing means for computing the true course of the craft from the latitude L, the speed K of the craft and the difference D between the azimuth directions of said gyro-compass and said magnetic compass, said computing means having a latitude element and an air speed element each adapted to be set by hand, a difference element automatically set by said gyro compass and magnetic compass, a mechanical linkage system including a part positioned automatically by said difference element, and by said latitude and airspeed elements by hand in accordance with latitude L and speed K for showing the ground course H in accordance with the equation $$\cos H = \frac{E \cos L \times \tan D}{K}$$

where E is the linear speed of a point on the earth's equator.

5. In a navigational instrument for use in mobile craft the combination of a self-orienting gyro-compass, the azimuth indications of which are affected by a systematic error depending on the speed and course of the craft and a directional gyro monitored by an instrument for indicating the direction of the horizontal component of the earth's magnetic field, a movable element, a differential device actuated by the azimuth indicating members of the gyro-compass and the directional gyro respectively so as to displace said movable element by an amount proportional to the speed and course error of the gyro-compass, a second movable element capable of being manually set according to a function of the latitude of the place, a third movable element capable of being set according to the ground speed of the craft and means for combining the displacements of said three elements so as to displace a fourth element to indicate the course of the craft.

6. In a navigational instrument for use in mobile craft, a self-orienting north-seeking gyro-compass the compass heading indications of which are affected by a systematic error D depending on the speed K and course H of the craft, a magnetic compass, a directional gyro monitored thereby, whereby the heading indications H of such gyro are not so affected, computing means for subtracting the two headings to furnish the course and speed error D of the gyro-compass, and computing means for indicating the ground speed K of the craft including means positioned in accordance with the course and speed error (D) and means settable in accordance with a trigonometric function of the latitude L, the earth's speed at the equator E and a trigonometric function of the course H for solving the equation $$K = \frac{E \cos L \times \tan D}{\cos H}$$

7. In a navigational instrument for use in mobile craft, the combination of a self-orienting north-seeking gyro compass, the azimuth indications of which are affected by a systematic error depending on the speed and course of the craft and a directional gyro monitored by an instrument responsive to the direction of the horizontal component of the earth's magnetic field, a movable element, a differential device actuated by the azimuth indicating members of the gyro compass and the directional gyro respectively so as to displace said movable element by an amount proportional to a function of the speed and course error D of the gyro compass, a second movable element displaceable by one of said gyros according to a function of the course H of the craft, and means for combining the displacements of said two elements with the earth's speed at that latitude ($E \cos L$) so as to displace a further element by an amount proportional to the speed of the craft K over the ground.

8. In a navigational instrument for use in mobile craft, a self-orienting north seeking gyro compass the heading indications of which are affected by a systematic error depending on the speed, latitude, and course of the craft, a magnetic compass, a directional gyro monitored therefrom, whereby the heading indications of said directional gyro are not affected by said error, means positioned by each of said gyro compass and directional gyro in accordance with the indicated respective headings, automatic means for subtracting such two headings so as to compute the heading and speed error of the gyro compass and computing means settable in accordance with the latitude and magnetic heading of the craft for automatically combining a function of said error, said heading and the earth's speed at said latitude to indicate the ground speed of the craft.

ARTHUR L. RAWLINGS.
HERBERT H. THOMPSON.

REFERENCES CITED

The following references are of record in the file of this patent:

UNITED STATES PATENTS

| Number | Name | Date |
|---|---|---|
| 1,255,480 | Sperry | Feb. 5, 1918 |
| 1,749,059 | Bassett | Mar. 4, 1930 |
| 1,986,807 | Gillmor | Jan. 8, 1935 |
| 2,027,926 | Myers et al. | Jan. 14, 1936 |
| 2,302,894 | Ross | Nov. 24, 1942 |
| 2,357,319 | Esval et al. | Sept. 5, 1944 |
| 2,385,348 | Chafee | Sept. 25, 1945 |
| 2,403,000 | Hight et al. | July 2, 1946 |
| 2,412,614 | Haskins et al. | Dec. 17, 1946 |
| 2,445,546 | Segebaden | July 20, 1948 |